United States Patent [19]

Kitaura et al.

[11] Patent Number: 5,681,632
[45] Date of Patent: Oct. 28, 1997

[54] OPTICAL INFORMATION RECORDING MEDIUM

[75] Inventors: Hideki Kitaura; Tetsuya Akiyama, both of Osaka; Takeo Ohta, Nara; Ken'ichi Nagata, Hyogo; Katsumi Kawahara; Noboru Yamada, both of Osaka, all of Japan

[73] Assignee: Matsushita Electric Industrial Co., Ltd., Osaka, Japan

[21] Appl. No.: 598,749

[22] Filed: Feb. 8, 1996

[30] Foreign Application Priority Data

Feb. 13, 1995 [JP] Japan ................... 7-024126
Feb. 5, 1996 [JP] Japan ................... 8-018015

[51] Int. Cl.⁶ ....................................... B32B 3/00
[52] U.S. Cl. ................ 428/641; 428/642; 428/644; 428/645; 428/646; 428/913; 430/270.12; 430/270.13; 430/495.1; 430/945; 369/283; 369/288
[58] Field of Search ................. 428/64.1, 64.2, 428/64.3, 64.4, 64.5, 64.6, 457, 913; 369/283, 288; 430/270.1, 270.11, 270.12, 270.13, 495.1, 945

[56] References Cited

U.S. PATENT DOCUMENTS

| | | | |
|---|---|---|---|
| 4,737,947 | 4/1988 | Osato et al. | 369/13 |
| 4,801,499 | 1/1989 | Aoyama et al. | 428/336 |
| 5,244,706 | 9/1993 | Hirata et al. | 428/64 |
| 5,254,382 | 10/1993 | Ueno et al. | 428/64 |
| 5,292,568 | 3/1994 | Tezuka et al. | 428/64 |
| 5,395,669 | 3/1995 | Kawahara et al. | 428/64 |
| 5,418,030 | 5/1995 | Tominaga et al. | 428/64 |

FOREIGN PATENT DOCUMENTS

| | | |
|---|---|---|
| 56-145530 | 11/1981 | Japan . |
| 1-273240 | 11/1989 | Japan . |
| 2-177141 | 7/1990 | Japan . |
| 3-088146 | 4/1991 | Japan . |
| 3-113844 | 5/1991 | Japan . |
| 3-263626 | 11/1991 | Japan . |
| 4-102243 | 4/1992 | Japan . |
| 5-144082 | 6/1993 | Japan . |
| 5-298747 | 11/1993 | Japan . |
| 5-298748 | 11/1993 | Japan . |
| 6-036344 | 2/1994 | Japan . |

*Primary Examiner*—Elizabeth Evans
*Attorney, Agent, or Firm*—Merchant, Gould, Smith, Edell, Welter & Schmidt, P.A.

[57] ABSTRACT

On a substrate, a recording layer which reversibly transforms between two states with different optical properties—a crystalline phase and an amorphous phase—by the irradiation of a laser beam, a first and a second dielectric layer on the bottom and the top surfaces of the recording layer, and a third dielectric layer on one surface of the first or the second dielectric layers and on the opposite side with respect to the recording layer are successively laminated, thus preparing an optical information recording medium. The third dielectric layer has a smaller coefficient of thermal expansion than the first and the second dielectric layers, so that the thermal deformation of the first and the second dielectric layers is reduced and the mass transfer of the recording layer is controlled. As a result, the overwrite cycle characteristics of the optical information recording medium are excellent.

19 Claims, 6 Drawing Sheets

OPTICAL INFORMATION RECORDING MEDIUM

FIELD OF THE INVENTION

This invention relates to a recording medium which comprises a recording layer having different optical properties between a crystalline state and an amorphous state, and further relates to an optical information recording medium that can overwrite information signals of high quality by irradiating a high energy beam such as a laser beam onto a thin film, made from a phase changing material, on a substrate.

BACKGROUND OF THE INVENTION

Phases of a thin film, formed on a substrate and made from a material such as a chalcogen, are transformed reversibly by locally heating the film with the irradiation of a laser beam. The phases of the thin film are the amorphous phase and the crystalline phase that have different optical constants (refractive index and extinction coefficients) and are reversibly transformed from one phase to another phase due to the variation of irradiation conditions. This method has been developed and applied as a method of recording information at high speed and density by detecting the difference of the quantity of reflected light or transmitted light having a particular wavelength as signals.

In a phase-change recording method, laser output is modulated by a single laser beam in response to information signals between two levels—recording level and erasing level, and then is irradiated on an information track, thus recording new information while previously recorded information is erased (Published Unexamined Japanese Patent Application (Kokai) No. Sho 56-145530). Unlike the optical magnetic recording method, a magnetic circuit member is not required in this method, thereby simplifying the head and carrying out erasing and recording processes at the same time. In other words, the time required for overwriting is shortened in this method.

In general, the optical information recording medium used in the above-mentioned recording method includes heat-resistant dielectric layers made from a material such as ZnS and $SiO_2$ on the top and bottom of a recording layer so as to prevent the evaporation of the recording layer due to repeated use, and also a reflection layer made from metal or the like on the dielectric layer to increase cooling speed and to apply irradiated light efficiently, so that the recording layer can be easily transformed to the amorphous state.

However, in overwriting information with a single beam, the light absorptivities are different between the amorphous section and the crystalline section of the recording layer. Since the latent heat of fusion is required in the crystalline section, a difference of light absorption sensitivity occurs between the amorphous section and the crystalline section. As a result, the shapes of recorded marks deteriorate slightly due to the overlapping conditions of old and new recorded marks during overwriting processes, thereby increasing time-base errors (jitter) of readout signals and lowering erasing rates. The increase in jitter and decrease in erasing ratio become a major detriment to increasing the linear velocity and density of recording, and, especially, introducing a mark edge recording method.

These problems can be solved by setting the light absorption sensitivities of the crystalline section and the amorphous section to be equal. When the difference of absorptivities ($\Delta A=Acry-Aamo$) is 5% or more, the latent heat of fusion of the crystalline section is cancelled and the difference of light absorption sensitivities between the crystalline state and the amorphous state is eliminated. Acry is the absorptivity of a laser beam having $\lambda$ wavelength for the crystalline state while Aamo is the rate for the amorphous state. Moreover, in order to obtain preferable C/N ratio, the difference of refractive indexes between the crystalline state and the amorphous state ($\Delta R=Rcry-Ramo$) should be 15% or more. Rcry is the refractance of a laser beam having $\lambda$ wavelength for the crystalline state while Ramo is the refractance for the amorphous state. (See Published Unexamined Japanese Patent Applications (Kokai) No. Hei 5-298747 and No. Hei 5-298748.)

However, when the reflectance of the reflection layer is high or the recording layer is so thick that irradiated light does not transmit to the opposite side of the substrate, the total of $\Delta A$ and $\Delta R$ becomes zero, so that the above-noted conditions cannot be satisfied. Thus, the materials and structure of the recording medium have to be chosen so as to transmit light in moderation. For example, Published Unexamined Japanese Patent Applications (Kokai) No. Hei 3-113844 and No. Hei 5-298748 disclose a three-layer recording medium composed of a recording layer and a first and a second dielectric layer formed on the bottom and top of the recording layer. Published Unexamined Japanese Patent Applications (Kokai) No. Hei 4-102243 and No. Hei 5-298747, moreover, disclose a four-layer recording medium which includes a reflection layer in addition to a recording layer and two dielectric layers. The reflection layer is made from a material having, low reflectance, or is thin. Especially, Kokai No. Hei 5-298747 and No. Hei 5-298748 disclose the recording medium, satisfying the conditions of $\Delta A \geq 5\%$ and $\Delta R \geq 15\%$ at the same time. In U.S. Pat. No. 5,395,669, the recording medium also includes a reflection layer.

FIG. 5 shows a cross-sectional view of an optical information recording medium of a conventional example comprising a reflection layer. On the surface of a transparent polycarbonate resin substrate, an about 160 nm thick ZnS-$SiO_2$ first dielectric layer, an about 25 nm thick Ge-Sb-Te alloy recording layer 3, an about 30 nm thick ZnS-$SiO_2$ second dielectric layer and an about 100 nm thick metallic reflection layer 7 made of aluminum or the like are successively laminated.

The overwrite cycle characteristics of a recording medium are disclosed, for example, in Published Unexamined Japanese Patent Application (Kokai) No. Hei 3-113844. However, the invention mentions only the control of the increase of litter to improve cyclavility (over write cycle characteristics), and discloses that bit error rates do not deteriorate when 3.70 MHz and 1.39 MHz signals having 7.5 m/s linear velocity and 90 ns pulse width are recorded alternatively and repeatedly 10,000 times. It is considered that the deterioration of repeatability is caused by the mass transfer of a recording layer in the rotating direction of a disc. The mass transfer is generated by the thermal deformation of dielectric layers due to quick heating with the irradiation of a laser beam. Therefore, the conventional problems mentioned above cannot be solved simply by correcting the difference of light absorptivities for controlling the increase in jitter.

SUMMARY OF THE INVENTION

It is an object of this invention to solve the abovementioned conventional problems by providing an optical information recording medium having preferable repeatability and recording and erasing properties without letting jitter increase in overwriting information at high linear velocity and density.

In order to accomplish this object, the optical information recording medium of this invention comprises a substrate, a recording layer and a first and a second dielectric layer on the bottom and top of the recording layer, and further comprises a third dielectric layer on the outside surface of at least one of the first and the second dielectric layer. The recording layer reversibly transforms between two optically detectable states by the irradiation of a beam onto the substrate. The third dielectric layer has a smaller coefficient of thermal expansion than the first and the second dielectric layer. The optical information recording medium comprises no metallic reflection layer.

It is preferable that the third dielectric layer has a thermal expansion coefficient less than $2.0 \times 10^{-6} K^{-1}$.

It is also preferable that the third dielectric layer is made from at least one inorganic oxide selected from the group consisting of $SiO_2$, $Ta_2O_5$ and $Nb_2O_5$ as main components. The third dielectric layer preferably comprises the main components at 70–100 mol %. N, S, C, F, H or the like can also be added to the third dielectric layer as a sub-component at about 0–30 mol %.

It is further preferable that the third dielectric layer is 10–400 nm thick.

It is further preferable that the recording layer is 2–300 nm thick.

It is further preferable that the first dielectric layer is 2–300 nm thick.

It is further preferable that the second dielectric layer is 2–300 nm thick.

It is preferable that the first and the second dielectric layers have a thermal expansion coefficient from $1.0 \times 10^{-6} K^{-1}$ to $30.0 \times 10^{-6} K^{-1}$.

It is also preferable that the first and the second dielectric layers are made from at least one inorganic material selected from the group consisting of $Al_2O_3$, $ZrO_2$, $TiO_2$, $AlN$, $Si_3N_4$, $TiN$, $SiC$, $ZnS$, $PbS$, $ZnSe$ and $CaF_2$ as main components, and that at least one element selected from the group consisting of metal or semimetal oxide, nitride, carbide, sulfide, selenide and fluoride is added to the inorganic material.

It is further preferable that the first and the second dielectric layers contain at least one inorganic oxide selected from the group consisting of $SiO_2$, $Ta_2O_5$ and $Nb_2O_5$ at less than 30 mol % as a sub-component.

It is preferable that the first and the second dielectric layers are made from a mixed material of ZnS at 70–100 mol% and $SiO_2$ at 30–0 mol %.

It is preferable that the recording layer is made of a chalcogen compound selected from the group consisting of Ge-Sb-Te, Ge-Sb-Te-Pd, Ge-Sb-Te-Bi, Ge-Sb-Te-Se, Ge-Te, Ge-Te-Bi, Ge-Te-Sn, Ge-Te-Bi-Se, Ge-Te-Sn-Au, Sb-Te, In-Sb-Te, Ag-In-Sb-Te and In-Se, or the chalocogen compound added with at least one element selected from the group consisting of nitrogen, oxygen, sulphur, carbon, fluorine and hydrogen.

It is also preferable that the recording layer is made of a Ge-Sb-Te type chalcogen compound, or the chalcogen compound added with at least one element selected from the group consisting of nitrogen, oxygen, sulphur, carbon, fluorine and hydrogen.

It is preferable that the substrate is made from at least one material selected from the group consisting of polycarbonate resin, polymethylmethacrylate resin, polyolefin resin and glass.

It is preferable that $\Delta R$ (which is Rcry-Ramo) is 15% or more while $\Delta A$ (which is Acry-Aamo) is 5% or more. That is a difference of reflectances ($\Delta R$=Rcry-Ramo) is 15% or more where Rcry is a reflectance of the light beam reflected by the recording layer which is in a crystalline state, and Ramo is the reflectance of the recording layer in an amorphous state; wherein a difference of absorptivities ($\Delta A$= Acry-Aamo) is 5% or more where Acry is an absorption coefficient of the light beam absorbed by the recording layer which is in the crystalline state, and Aamo is the absorption coefficient of the recording layer in the amorphous state.

It is preferable that the third dielectric layer having a reflectance smaller than the first dielectric layer and the second dielectric layer.

It is preferable that the third dielectric layer has 1.2–1.8 reflectance (n).

It is preferable that reflectance measured from the side of the substrate before and after the process of recording information is less than 50%.

It is also preferable that reflectance measured from the side of the substrate before and after the process of recording information is less than 30%.

The first, second and third dielectric layers and the recording layer can be formed by a vacuum deposition method, a sputtering method, an ion plating method, a Chemical Vapor Deposition (CVD) method, and a Molecular Beam Epitaxy (MBE) method.

In this invention, no metallic reflection layer is required since a dielectric layer having a small coefficient of thermal expansion (third dielectric layer) is formed on the surface of the first or the second dielectric layer. Thus, thermal deformation of the first and the second dielectric layers is minimized, and mass transfer of the recording layer is controlled. As a result, the repeatability of the recording medium is improved. By applying a layer having a small reflectance as the third dielectric layer, an optical information recording medium with preferable repeatability is provided without reducing the properties of the conventional three-layer recording medium.

On the substrate, the recording layer which reversibly transforms between the crystalline state and the amorphous state by the irradiation of a laser beam, the first and second dielectric layers on the top and bottom of the recording layer, and the third dielectric layer formed on one surface of the first or the second dielectric layer and on the opposite side to the recording layer are laminated so as to form the optical information recording medium of this invention. The third dielectric layer has a smaller coefficient of thermal expansion than the first and the second dielectric layers, thus limiting the mass transfer of the recording layer and improving repeatability. Since the third dielectric layer has a small reflectance, the recording medium has preferable repeatability without reducing the good optical properties of the conventional three-layer recording medium.

The optical information recording medium of this invention has preferable recording and erasing properties without increasing jitter during overwriting processes, and has good repeatability.

DETAILED DESCRIPTION OF THE INVENTION

This invention will be describedby referring to the following illustrative examples and attached figures.

Figure 1:
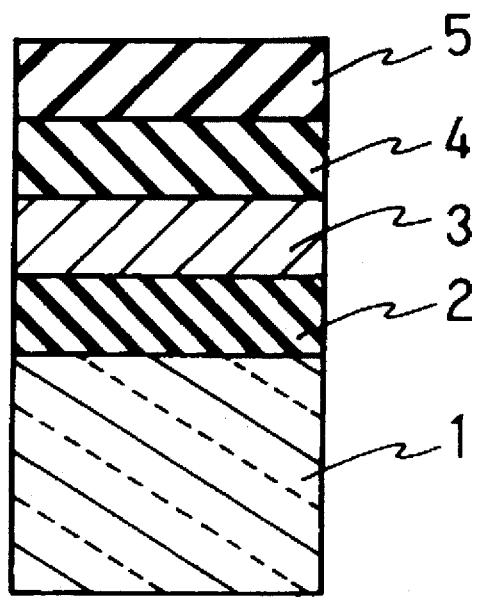
FIG. 1 is a cross-sectional view of an optical information recording medium of Example 1 of the invention.
Figure 2:
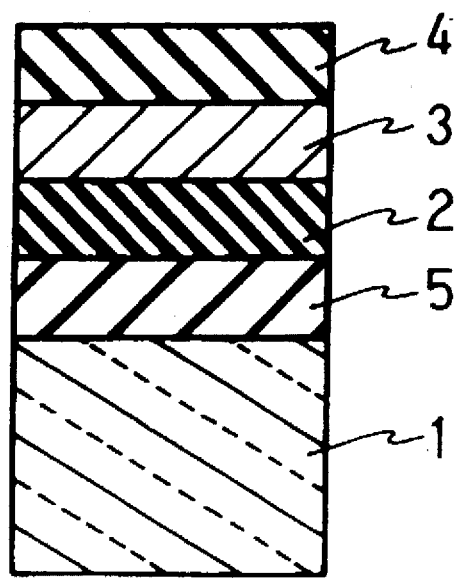
FIG. 2 is a cross-sectional view of an optical information recording medium of Example 2 of the invention.
Figure 3:
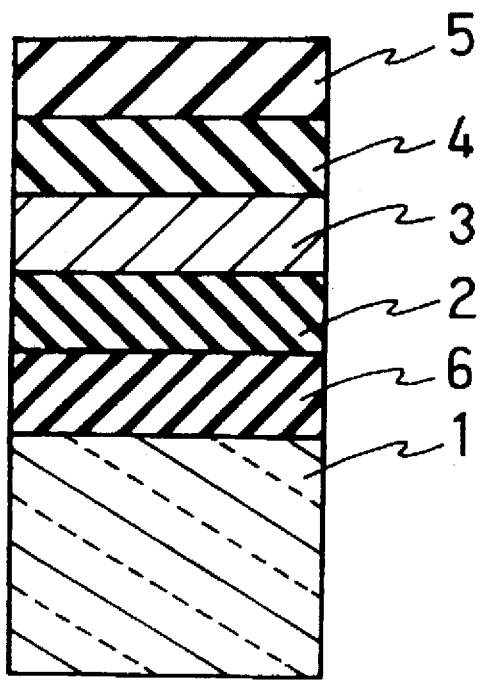
FIG. 3 is a cross-sectional view of an optical information recording medium of Example 3 of the invention.

In FIG. 1, 1 is a transparent disk substrate; 2 is a first dielectric layer made from, for example, ZnS-SiO$_2$; 3 is a recording layer such as a Te-Ge-Sb alloy film; 4 is a second dielectric layer made from the same material as the material of the first dielectric layer; 5 is a third dielectric layer of SiO$_2$ or the like. The layers were formed by a sputtering method. In FIG. 2, a third dielectric layer 5, which is the same as the third dielectric layer of FIG. 1, is formed between the substrate and first dielectric layer 2 shown in FIG. 1. In FIG. 3, third dielectric layer 5 is laminated on the outside surface of second dielectric layer 4, and fourth dielectric layer 6 made of the same materials as the third dielectric layer is formed between the substrate and first dielectric layer 2.

The coefficients of thermal expansion of each dielectric layers useful in this invention are shown in the following Table 1.

TABLE 1

| Dielectric Layer | Thermal Expansion |
| --- | --- |
| SiO$_2$ | $0.5 \times 10^{-6} K^{-1}$ |
| Ta$_2$O$_5$ | $0.8 \times 10^{-6} K^{-1}$ |
| Nb$_2$O$_5$ | $-1.2 \times 10^{-6} K^{-1} - 0 \times 10^{-6} K^{-1}$ |
| Al$_2$O$_3$ | $6.7 \times 10^{-6} K^{-1}$ |
| ZrO$_2$ | $7.7 \times 10^{-6} K^{-1}$ |
| TiO$_2$ | $9.1 \times 10^{-6} K^{-1}$ |
| Si$_3$N$_4$ | $3.0 \times 10^{-6} K^{-1}$ |
| SiC | $4.8 \times 10^{-6} K^{-1}$ |
| ZnS | $7.5 \times 10^{-6} K^{-1}$ |
| PbS | $19.0 \times 10^{-6} K^{-1}$ |
| ZnSe | $5.3 \times 10^{-6} K^{-1}$ |
| CaF$_2$ | $3.2 \times 10^{-6} K^{-1}$ |

The thickness of the transparent substrate is not particularly limited, but an about 0.6–1.2 mm thick substrate can be used in this invention.

The C/N ratios of a frequency (f1) were measured when single pattern signals of the frequency (f1) were recorded. By overwriting single pattern signals of a frequency (f2) over the single pattern signals of f1, erasing ratios (damping ratios of signal strength of the f1 component) were measured.

The jitter is a time-base lag or a gap between an original signal and a readout signal. In this invention, a ratio between a window width and the maximum litter is mentioned as "litter", but is normally called "jitter ratio" or "window margin loss (or total jitter/window)".

EXAMPLE 1

In FIG. 1, reference numeral 1 denotes a disk substrate made from 1.2 mm thick polycarbonate resin; reference numeral 2 denotes a first dielectric layer made from a mixed material of ZnS-SiO$_2$ (ZnS:SiO$_2$=about 80:20 mole %) and is about 160 nm thick; referance numeral 3 denotes a recording layer made from a Ge-Sb-Te alloy thin film (Ge:Sb:Te=about 21:25:54 atom %) and is about 25 nm thick; and reference numeral 4 denotes a second dielectric layer which is made from the same material as. the first dielectric layer and is about 40 nm thick. These layers were formed by a sputtering method.

A double-sided disk can be prepared by adhering disk substrates to each other with conventional hot-melt type adhesive, or a single plate disk is prepared by overcoating disk substrates with ultraviolet ray curing resin or the like. In this example, the surface of the disk substrate formed with the layers was set to face the surface of a dummy substrate having grooves, and was adhered to the surface of the dummy substrate with ultraviolet ray curing resin, thus overcoating the substrates.

The coefficient of thermal expansion of the first and the second dielectric layers (ZnS-SiO$_2$) was $7.4 \times 10^{-6} K^{-1}$, and the coefficient of the third dielectric layer (SiO$_2$) was $0.5 \times 10^{-6} K^{-1}$. ΔA (Acry-Aamo) was 8%. ΔA is the difference of absorptivities between the crystalline phase and the amorphous phase. An absorption coefficient of a laser beam by the recording layer is Acry when the layer is in the crystalline phase; an absorption coefficient is Aamo when the layer is in the amorphous phase. Rcry is a reflectance of the light beam reflected by the recording layer which is in a crystalline state, and Ramo is the reflectance of the recording layer in an amorphous state. Rcry was 41%; Ramo was 21%; ΔR was 20%; Acry was 45%; and Aamo was 37%.

Figure 4:
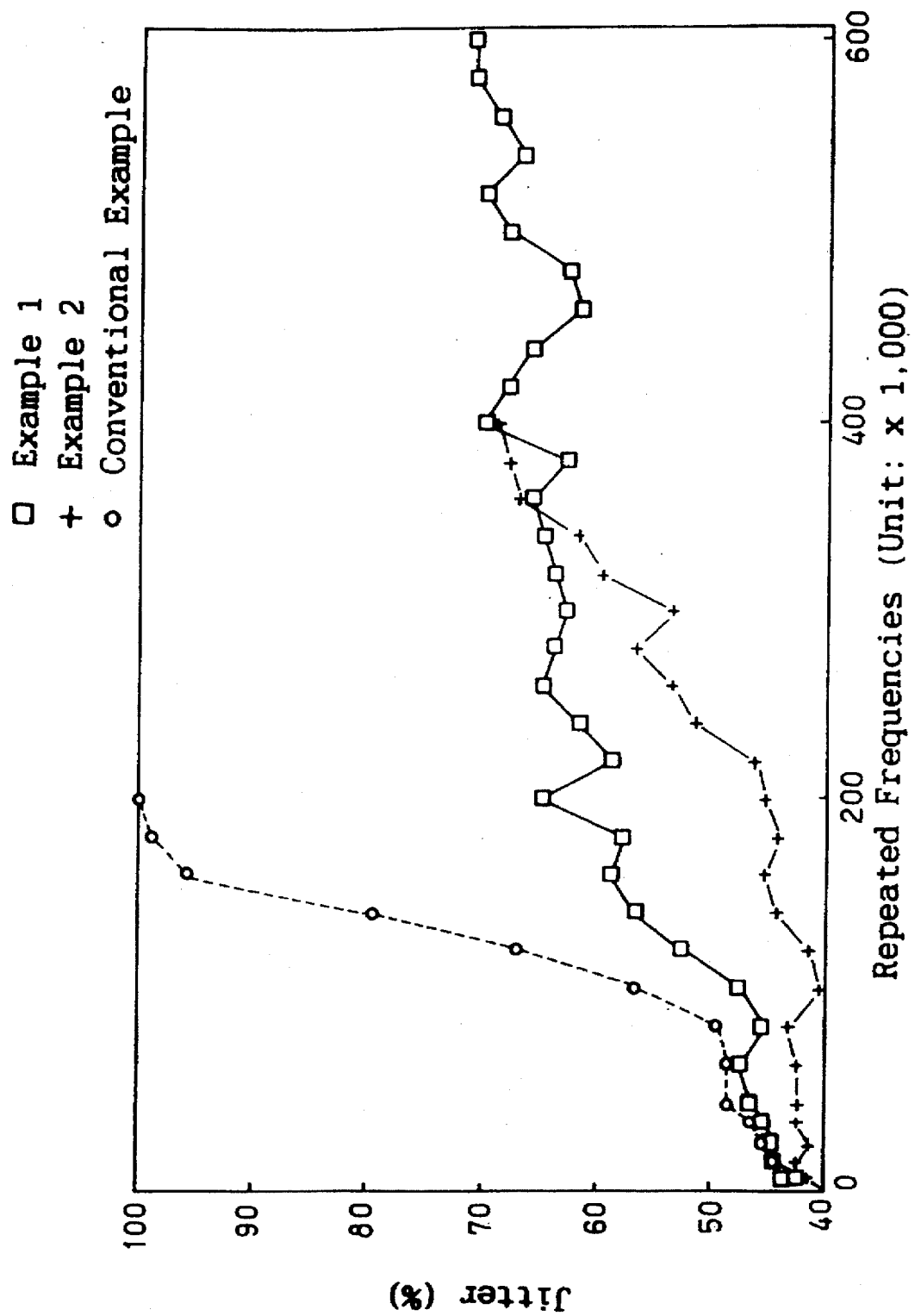
FIG. 4 is a graph showing the correlation between jitter and the number of repeated times of overwriting of each optical information recording medium in Example 1, Example 2 and a conventional example.
Figure 5:
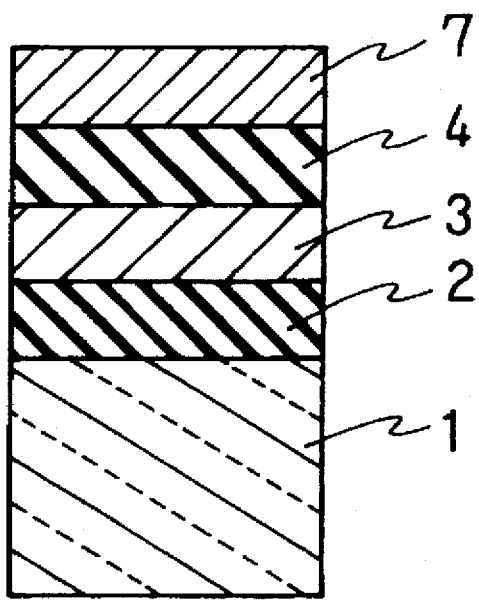
FIG. 5 is a cross-sectional view of an optical information recording medium of the conventional example.
Figure 6:
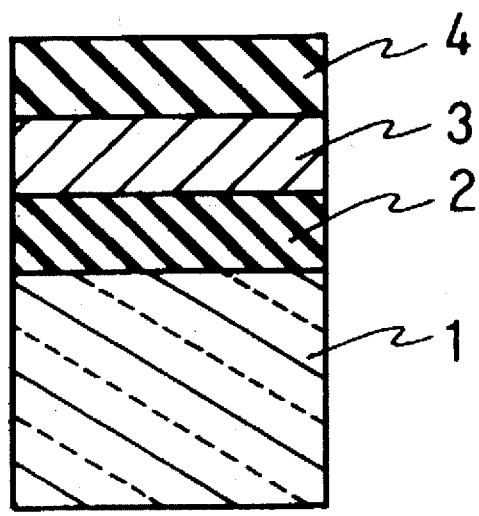
FIG. 6 is a cross-sectional view of a three-layer optical information recording medium of a conventional example.

The recording and erasing properties of the record medium of this invention are measuredby overwriting signals (f1=6.9 MHz and f2=2.6 MHz) at 830 nm laser wavelength, 0.5 lens aperture number and 11 m/sec linear velocity. As a result, the C/N ratios of recorded signals were 54 dB or more while the erasing ratios of the signals were 30 dB or more. Overwrite cycle characteristics were tested by measuring jitter in overwriting 2-7 modulation random signals. The result is shown in FIG. 4, and the jitter was within 80% when signals were overwritten by more than 600,000 times. Under the same conditions, the jitter of the conventional three-layer recording medium, which is shown in FIG. 6 and has a recording layer 3, a first dielectric layer 2 and a second dielectric layer 4 of the same thickness as the layers of this example, exceeds 80% as signals were overwritten by about 150,000 times. In other words, compared with the conventional recording medium, the recording medium of this example has significantly superior properties.

EXAMPLE 2

A recording medium shown in FIG. 2 comprises third dielectric layer 5 of FIG. 1 between a substrate and a first dielectric layer. A disc substrate 1 is made from 1.2 mm polycarbonate resin. On the substrate, a fourth dielectric layer, the first dielectric layer, a recording layer and a second dielectric layer are successively laminated. The fourth dielectric layer is made from about 40 nm thick SiO$_2$. First dielectric layer 2 is made from about 160 nm thick ZnS-SiO$_2$ (ZnS:SiO$_2$=about 80:20 mol %). Recording layer 3 is made from an about 25 nm thick Ge-Sb-Te alloy thin film (Ge:Sb:Te=about 21:25:54 atom %). Second dielectric layer 4 is made from about 160 nm thick ZnS-SiO$_2$ (ZnS:SiO$_2$= about 80:20 atom %). The Rcry of the record medium was 41%; Ramo was 21%; ΔR was 20%; Acry was 46%; Aamo was 38%; and ΔA was 8%.

The overwriting properties and repeatability of the recording medium were tested under the same conditions as in Example 1. As a result, the C/N ratios of the recording signals were 54 dB or more while the erasing ratios of the signals were 30 dB or more. Jitter was within 80% when 2-7 modulation random signals were overwritten by more than 400,000 times. Thus, as in Example 1, the recording medium of this example had better properties and repeatability than the conventional recording medium.

EXAMPLE 3

A recording medium shown in FIG. 3 has a disk substrate made from 1.2 mm thick polycarbonate resin. On the substrate, a fourth dielectric layer 6, a first dielectric layer 2, a recording layer 3, a second dielectric layer 4 and a third dielectric layer 5 are succesively laminated. The fourth dielectric layer is made from about 40 nm thick $SiO_2$. The first dielectric layer is made from about 160 nm thick $ZnS-SiO_2$ ($ZnS:SiO_2$=about 80:20 mol %). The recording layer is made from an about 25 nm thick Ge-Sb-Te alloy thin film (Ge:Sb:Te=about 21:25:54 atom %). The second dielectric layer is made from about 160 nm thick $ZnS-SiO_2$. The third dielectric layer is made from about 40 nm thick $SiO_2$. The Rcry of the record medium was 40%; Ramo was 19%; ΔR was 21%; Acry was 46%; Aamo was 38%; and ΔA was 8%.

The overwriting properties and overwrite cycle characteristics of the recording medium were tested under the same conditions as in Example 1. As a result, the C/N ratios of the recording signals were 54 dB or more while the erasing ratios of the signals were 30 dB or more. Jitter was within 80% as 2-7 modulation random signals were overwritten by more than 400,000 times. Thus, as in Example 1, the recording medium of this example had better properties and repeatability than the conventional recording medium.

Although $SiO_2$ was used as the third dielectric layer in the above-mentioned examples, the same effects are provided by instead using $Ta_2O_5$ or $Nb_2O_5$. Furthermore, an element such as N, S, C, F and H may be added to the third dielectric layer as a subcomponent.

The invention may be embodied in other forms without departing from the spirit or essential characteristic thereof. The embodiments disclosed in this application are to be considered in all respects ss illustrative and not restrictive, the scope of the invention is indicated by the appended claims rather than by the foregoing description, and all changes which come within the meaning and range of equivalency of the claims are intended to be embraced therein.

What is claimed is:

1. An optical information recording medium comprising on a substrate:

a recording layer which reversibly transforms between optically detectable crystalline and amorphous states by the irradiation of a laser beam; and a first dielectric layer and a second dielectric layer formed on a bottom and a top surface of said recording layer; said optical information recording medium further comprising a third dielectric layer on an outside surface of at least one layer selected from the group consisting of said first dielectric layer and second dielectric layer; said third dielectric layer having a coefficient of thermal expansion smaller than coefficients of thermal expansion of said first dielectric layer and said second dielectric layer; and wherein said optical information recording medium comprises no metallic reflection layer, wherein a difference of reflectances (ΔR=Rcry−Ramo) is 15% or more where Rcry is a reflectance of the light beam reflected by said recording layer which is in a crystalline state, and Ramo is the reflectance of said recording layer in an amorphous state; and wherein a difference of absorptivities (ΔA=Acry−Aamo) is 5% or more where Acry is an absorption coefficient of the light beam absorbed by said recording layer which is in the crystalline state, and Aamo is the absorption coefficient of said recording layer in the amorphous state.

2. The optical information recording medium according to claim 1, wherein the third dielectric layer has a thermal expansion coefficient less than $2.0 \times 10^{-6} K^{-1}$.

3. The optical information recording medium according to claim 1, wherein the third dielectric layer comprises at least one inorganic oxide selected from the group consisting of $SiO_2$, $Ta_2O_5$, and $Nb_2O_5$ as main components.

4. The optical information recording medium according to claim 3, wherein the main components of the third dielectric layer at 70–100 mol% and at least one atom selected from the group consisting of N, S, C, F, H add to the third dielectric layer as a sub-component at 0–30 mol %.

5. The optical information recording medium according to claim 1, wherein the third dielectric layer is 10–400 nm thick.

6. The optical information recording medium according to claim 1, wherein the recording layer is 2–300 nm thick.

7. The optical information recording medium according to claim 1, wherein the first dielectric layer is 2–300 nm thick.

8. The optical information recording medium according to claim 1, wherein the second dielectric layer is 2–300 nm thick.

9. The optical information recording medium according to claim 1, wherein the first dielectric layer and the second dielectric layer have a thermal expansion coefficient from $1.0 \times 10^{-6} K^{-1}$ to $30.0 \times 10^{-6} K^{-1}$.

10. The optical information recording medium according to claim 1, wherein the first dielectric layer and the second dielectric layer comprise at least one inorganic material selected from the group consisting of $Al_2O_3$, $ZrO_2$, $TiO_2$, AlN, $Si_3N_4$, TiN, SiC, ZnS, PbS, ZnSe and $CaF_2$ as main components.

11. The optical information recording medium according to claim 1, wherein the first dielectric layer and the second dielectric layer comprise at least one inorganic oxide selected from the group consisting of $SiO_2$, $Ta_2O_5$ and $Nb_2O_5$ at less than 30 mol % as sub-components.

12. The optical information recording medium according to claim 1, wherein the first dielectric layer and the second dielectric layer comprise ZnS at 70–100 mol % and $SiO_2$ at 30–0 mol %.

13. The optical information recording medium according to claim 1, wherein the recording layer comprises a chalcogen compound selected from the group consisting of Ge-Sb-Te, Ge-Sb-Te-Pd, Ge-Sb-Te-Bi, Ge-Sb-Te-Se, Ge-Te, Ge-Te-Bi, Ge-Te-Sn, Ge-Te-Bi-Se, Ge-Te-Sn-Au, Sb-Te, In-Sb-Te, Ag-In-Sb-Te and In-Se, or said chalcogen compound added with at least one element selected from the group consisting of nitrogen, oxygen, sulphur, carbon, fluorine and hydrogen.

14. The optical information recording medium according to claim 1, wherein the recording layer comprises a Ge-Sb-Te type chalcogen compound, or said chalcogen compound to which is added at least one element selected from the group consisting of nitrogen, oxygen, sulphur, carbon, fluorine and hydrogen.

15. The optical information recording medium according to claim 1, wherein the substrate comprises at least one material selected from the group consisting of polycarbonate resin, polymethylmethacrylate resin, polyolefin resin and glass.

16. The optical information recording medium according to claim 1, wherein said third dielectric layer having a reflectance smaller than said first dielectric layer and said second dielectric layer.

17. The optical information recording medium according to claim 1, wherein the third dielectric layer has 1.2–1.8 reflectance (n).

18. The optical information recording medium according to claim 1, wherein the reflectance of the optical information recording medium measured from the side of the substrate before and after a process of recording information is less than 50%.

19. The optical information recording medium according to claim 18, wherein the reflectance measured from the side of the substrate before and after a process of recording information is less than 30%.

* * * * *